(12) United States Patent
Tanaka (10) Patent No.: US 12,321,151 B2
(45) Date of Patent: Jun. 3, 2025

(54) SETTING SYSTEM, SETTING DEVICE, SETTING METHOD, AND NON-TRANSITORY COMPUTER READABLE STORAGE MEDIUM

(71) Applicant: Yokogawa Electric Corporation, Musashino (JP)

(72) Inventor: Hidekazu Tanaka, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 400 days.

(21) Appl. No.: 17/890,324

(22) Filed: Aug. 18, 2022

(65) Prior Publication Data

US 2023/0062394 A1    Mar. 2, 2023

(30) Foreign Application Priority Data

Aug. 26, 2021    (JP) ................................ 2021-137835

(51) Int. Cl.
G05B 19/4155    (2006.01)

(52) U.S. Cl.
CPC .................... *G05B 19/4155* (2013.01); *G05B 2219/32398* (2013.01)

(58) Field of Classification Search
CPC ...... G05B 19/4155; G05B 2219/32398; G05B 2219/1138; G05B 2219/25061; G05B 2219/25428; G05B 19/0423; Y02P 90/02
See application file for complete search history.

(56) References Cited

U.S. PATENT DOCUMENTS

| | | | |
|---|---|---|---|
| 8,938,557 B2 | 1/2015 | Meyer et al. | |
| 9,038,150 B2 * | 5/2015 | Kodama | H04W 12/041 |
| | | | 713/168 |
| 10,838,381 B2 | 11/2020 | Mori et al. | |
| 2009/0222242 A1 * | 9/2009 | Kodama | G05B 19/4185 |
| | | | 702/188 |

(Continued)

FOREIGN PATENT DOCUMENTS

| | | |
|---|---|---|
| JP | 2019-074880 A | 5/2019 |
| WO | 2020/076517 A1 | 4/2020 |

OTHER PUBLICATIONS

Office Action dated Sep. 6, 2024, issued in counterpart EP Application No. 22191164.7. (4 pages).

*Primary Examiner* — Mohammad Ali
*Assistant Examiner* — Dhruvkumar Patel
(74) *Attorney, Agent, or Firm* — WHDA, LLP (57) ABSTRACT

A setting system performs setting required for causing a field device to perform a predetermined operation on the field device. The setting system includes a server apparatus configured to provide device setting data in which identification information of the field device and setting data to be set in the field device are associated with other, and an input/output device that is a device interposed between the field device and a control device controlling the field device. In a case in which connection between the input/output device and the field device has been established, the input/output device is configured to perform the setting of the field device by transmitting, to the field device, the setting data associated with the identification information of the field device with which the connection has been established out of the device setting data provided from the server apparatus.

18 Claims, 6 Drawing Sheets

(56) References Cited

U.S. PATENT DOCUMENTS

| | | | |
|---|---|---|---|
| 2016/0110304 A1* | 4/2016 | Mori | G05B 19/0423 |
| | | | 710/306 |
| 2017/0371325 A1* | 12/2017 | Kodama | G05B 19/41845 |
| 2019/0113898 A1* | 4/2019 | Mori | G05B 19/042 |
| 2019/0302722 A1* | 10/2019 | Nozaka | G05B 19/0425 |
| 2021/0165383 A1* | 6/2021 | Garcia | G05B 19/0426 |

* cited by examiner

| FIELD DEVICE | | INPUT/OUTPUT DEVICE D-k | |
|---|---|---|---|
| DEVICE ID | SETTING DATA | INPUT/OUTPUT DEVICE ID | SETTING DATA OF INPUT/OUTPUT DEVICE |
| 00a | Da | 0000k | D00k |
| 00b | Db | | |
| 00c | Dc | | |

SETTING SYSTEM, SETTING DEVICE, SETTING METHOD, AND NON-TRANSITORY COMPUTER READABLE STORAGE MEDIUM

BACKGROUND

Field of the Invention

The present invention relates to a setting system, a setting device, a setting method, and a non-transitory computer readable storage medium.

Priority is claimed on Japanese Patent Application No. 2021-137835, filed on Aug. 26, 2021, the contents of which are incorporated herein by reference.

Description of Related Art

Process control systems built into a plant, a factory, and the like (hereinafter, simply referred to as "plants" in a case in which these are collectively referred to) have a configuration in which field equipment (measuring devices and operating devices) generally called field devices and a control device controlling these are connected through an input/output device. In such a process control system, a control device collects process values (for example, measured values such as a pressure, temperature, and a flow rate) acquired by field devices through an input/output device, and the control device performs an operation of operating (controlling) the field devices through the input/output device in accordance with the collected process values. By repeating such operations, advanced automatic operations of plants and the like are realized. For an overview of a process control system, for example, Japanese Unexamined Patent Application Publication No. 2019-74880 may be referred to.

However, in such a process control system, a setting that is necessary for causing a field device to perform a predetermined operation needs to be performed on the field device in advance. However, generally, since a setting operation and an operation checking operation for a field device need to be manually performed in accordance with a plurality of procedures using a terminal such as an engineering device or a hand-held terminal device, there is a problem in that it takes time.

SUMMARY

A setting system may perform setting required for causing a field device to perform a predetermined operation on the field device. The setting system may include a server apparatus configured to provide device setting data in which identification information of the field device and setting data to be set in the field device are associated with other, and an input/output device that is a device interposed between the field device and a control device controlling the field device, wherein in a case in which connection between the input/output device and the field device has been established, the input/output device is configured to perform the setting of the field device by transmitting, to the field device, the setting data associated with the identification information of the field device with which the connection has been established out of the device setting data provided from the server apparatus.

Further features and aspects of the present disclosure will become apparent from the following detailed description of exemplary embodiments with reference to the attached drawings.

DETAILED DESCRIPTION

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a setting system, a setting device, a setting method, and a non-transitory computer readable storage medium capable of shortening an operation time required for setting field devices compared with that of a conventional case.

Hereinafter, a setting system, a setting device, a setting method, and a non-transitory computer readable storage medium according to embodiments of the present invention will be described in detail with reference to the drawings. Hereinafter, first, an overview of an embodiment of the present invention will be described, and subsequently, details of the embodiment of the present invention will be described.

OVERVIEW

An embodiment of the present invention causes an operation time required for setting field devices to be shortened further compared with that of a conventional case. More specifically, setting data to be set in a field device is stored in an input/output device, and, in a case in which connection between the input/output device and the field device is established, the setting data stored inside the input/output device is automatically reflected in the field device.

In a process control system, a setting required for causing a field device to perform a predetermined operation needs to be performed for the field device in advance. For example, a setting operation for a field device is performed at the time of start (start-up) and at the time of a maintenance operation of the process control system. The maintenance operation is regularly performed after start-up of the process control system, and examples thereof are calibration of a field device, replacement of an old field device, replacement of a broken device, output checking, various tests, and the like.

Generally, such a setting operation for a field device is manually performed by an operator using an engineering device or a hand-held terminal. An example of the procedure of specific engineering is as below. First, configuration information of the inside of a field device is acquired from a capability file (CF) in which capability information, resource information, and the like of a field device are written and a device description (DD) file in which attribute information of device parameters and the like are written. Next, setting data to be set in the field device is generated on the basis of the acquired configuration information and data of communication definitions and application definitions defined by a user. Then, the generated setting data is downloaded (read) into the field device on a site of a plant in which the field device is installed.

In a process control system of a large scale, thousands of field devices are installed, and an operation time required for setting all the field devices is acquired by accumulating operation times required for setting respective field devices. For this reason, in a case in which a setting operation required for performing a setting operation for one field device is long, a tremendous amount of time and effort is necessary until an operation at the time of start-up or a maintenance operation is completed.

In an embodiment of the present invention, first, setting data to be set in a field device is stored in the input/output device. Then, an operation of connecting the field device to the input/output device is performed, and, in a case in which connection between the input/output device and the field device is established, the input/output device transmits the setting data to the field device, whereby the setting of the field device is performed. In this way, according to this embodiment, simply by connecting the field device to the input/output device, setting of the field device is performed. For this reason, an operation time required for setting a field device can be shortened further compared with that of a conventional case.

DETAILS

<Process Control System>

Figure 1:
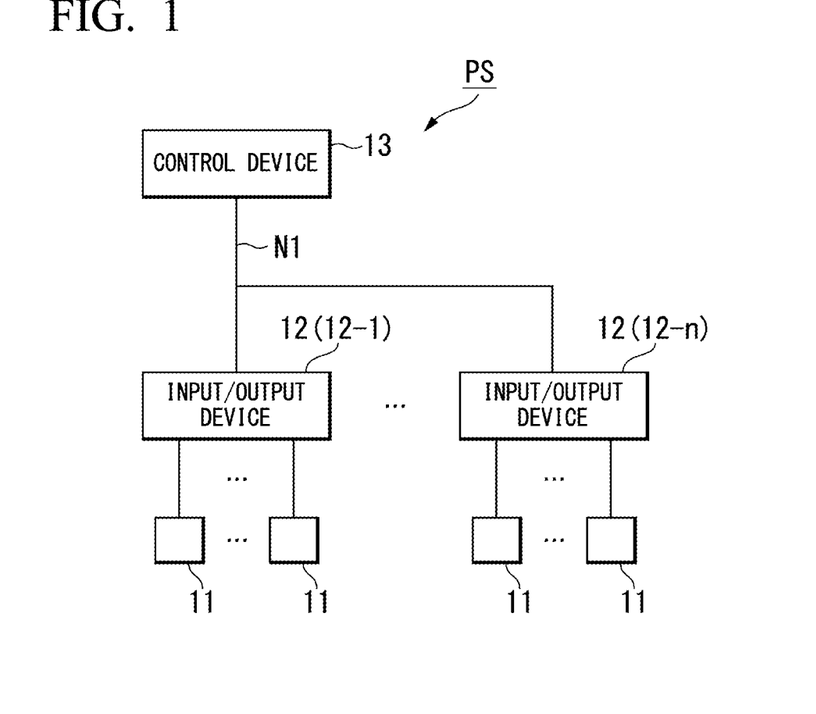
FIG. 1 is a block diagram illustrating a main part configuration of a process control system according to an embodiment of the present invention.

FIG. 1 is a block diagram illustrating a main part configuration of a process control system. As illustrated in FIG. 1, the process control system PS includes field devices 11, input/output devices 12, and a control device 13, and the control device 13 controls the field devices 11 in accordance with an instruction or the like from an operation monitoring terminal (not illustrated) or the like, whereby an industrial process realized in a plant (not illustrated) is controlled. In the process control system PS, a setting required for causing the field device 11 to perform a predetermined operation is performed by a setting system 1 (see FIG. 2) to be described below.

The field device 11 is connected to the control device 13 through the input/output device 12. For example, the field device 11 is a sensor device such as a flow rate meter or a temperature sensor, a valve device such as a flow rate control valve or an opening/closing vale, an actuator device such as a fan or a motor, or any other device installed on a site of a plant. For example, the field device 11 can perform communication using HART (registered trademark) that is one kind of general-purpose communication protocol for a process industry. The field device 11 may perform communication using a communication protocol other than HART (registered trademark) (for example, FOUNDATION Fieldbus (registered trademark) or the like).

The input/output device 12 is interposed between the field device 11 and the control device 13 and connects the field device 11 to the control device 13. In the example illustrated in FIG. 1, a plurality of input/output devices 12-1 to 12-n (here, n is an integer equal to or greater than 2) are connected to the control device 13 via a network N1. The input/output devices 12-1 to 12-n have the same configuration and will be respectively referred to as an "input/output device 12" in a case in which the input/output devices do not particularly need to be distinguished from each other. In the example illustrated in FIG. 1, a plurality of field devices 11 are connected to the input/output device 12. However, the configuration is not limited thereto, and one field device 11 may be connected to the input/output device 12. The input/output device 12 is an example of a "setting device". The network N1 may be a wired network or a wireless network or a combination thereof.

The control device 13 communicates with one or more field devices 11 through one or more input/output devices 12, thereby controlling the corresponding field devices 11. More specifically, the control device 13 acquires a process value measured by a certain field device 11 (for example, a sensor device) and calculates and transmits an operation amount of another field device 11 (for example, a valve device), thereby controlling the other field device 11 (for example, the valve device).

<Setting System>

Figure 2:
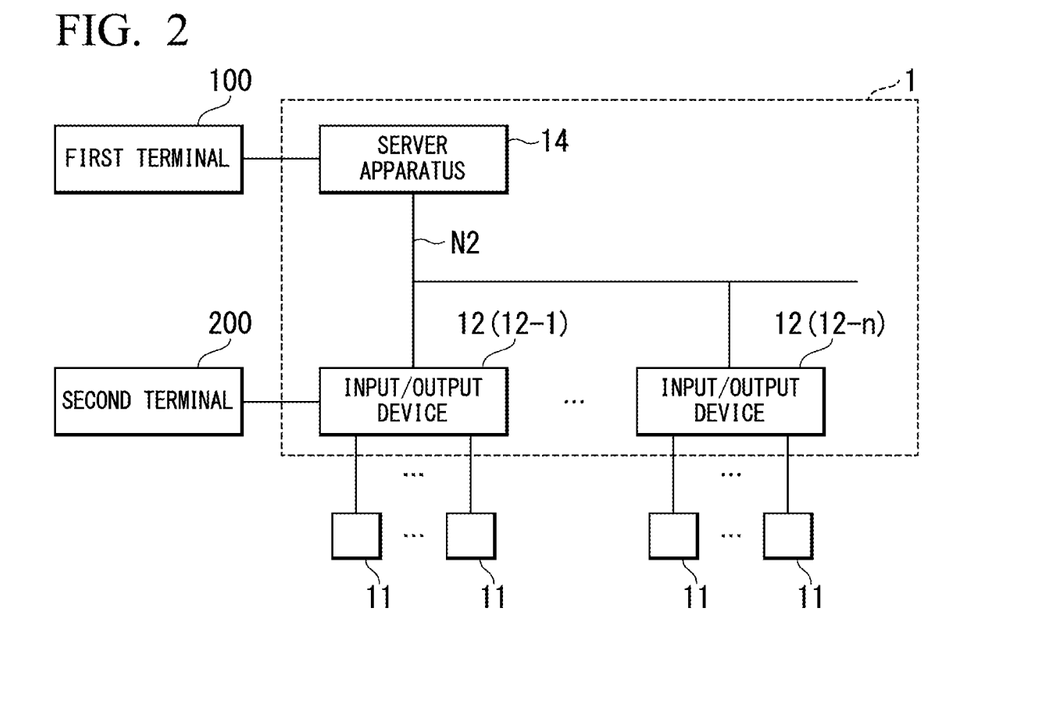
FIG. 2 is a block diagram illustrating a main part configuration of a setting system according to an embodiment of the present invention.

FIG. 2 is a block diagram illustrating a main part configuration of a setting system according to an embodiment of the present invention. As illustrated in FIG. 2, the setting system 1 according to this embodiment is a system that is realized using a server apparatus 14 and one or more input/output devices 12 and performs a setting required for causing the field device 11 to perform a predetermined operation for the field device 11. In the example illustrated in FIG. 2, the setting system 1 includes the server apparatus 14 and a plurality of input/output devices 12-1 to 12-n. Examples of the setting performed by the setting system 1 for the field device 11 include a communication setting for enabling digital communication, a function block setting for operating a functional block, and the like.

<Server Apparatus>

For example, the server apparatus 14 is disposed on the Internet or on the cloud. The server apparatus 14 is connected to a plurality of input/output devices 12-1 to 12-n via a network N2. The network N2 may be a wired network or a wireless network or a combination thereof. The server apparatus 14 provides device setting data D (see FIG. 3) in which identification information of a field device 11 and setting data to be set in the field device 11 are associated with each other. For example, in a case in which device setting data to be provided is updated, the server apparatus 14 provides the updated device setting data for the input/output device 12. In addition, as an initial setting for the input/output device 12, the server apparatus 14 provides device setting data to the input/output device 12. For example, at the time of start-up of the process control system PS, at the time of installation of a device, or the like, the server apparatus 14 provides the device setting data for the input/output device 12 as an initial setting. A first terminal 100 is connected to the server apparatus 14. The first terminal 100 is a terminal that is operated by an operator such as a worker and inputs device setting data to the inside of the server apparatus 14 or updates device setting data inside the server apparatus 14 in accordance with an operation of an operator.

Figure 3:
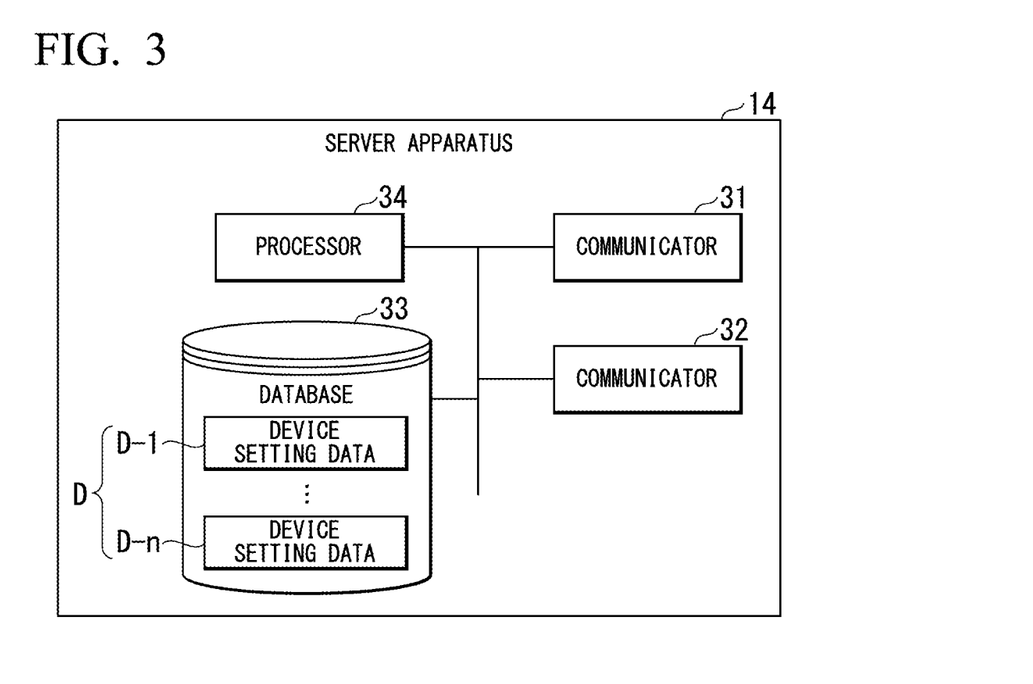
FIG. 3 is a block diagram illustrating a main part configuration of a server apparatus according to an embodiment of the present invention.

FIG. 3 is a block diagram illustrating a main part configuration of a server apparatus according to an embodiment of the present invention. As illustrated in FIG. 3, the server apparatus 14 according to this embodiment includes a communicator 31, a communicator 32, a database 33, and a processor 34.

The communicator 31 communicates with the first terminal 100 under the control of the processor 34. In accordance with reception of an instruction from the first terminal 100 in the communicator 31, for example, new device setting data D is stored in the database 33 or device setting data D that has already been in stored in the database 33 is updated. The communicator 32 communicates with a plurality of input/output devices 12 under the control of the processor 34.

In the database 33, setting data of all the field devices 11 used by the process control system PS is stored. As a specific example, device setting data D in which identification information of each field device 11 and setting data to be set in the field device 11 are associated with each other is stored in the database 33. This device setting data D is divided for each input/output device 12. For this reason, as illustrated in FIG. 3, device setting data D-1 to D-n respectively corresponding to the input/output devices 12-1 to 12-n is stored in the database 33.

For example, in a case in which a plurality of field devices 11 are connected to the input/output device 12-k (here, k=1, ..., n), identification information (hereinafter, referred to as a "device ID") of each field device 11 connected to the input/output device 12-k and setting data are associated with each other for the device setting data D-k. In addition, identification information of the input/output device 12-k (hereinafter, referred to as an "input/output device ID) and setting data to be set in the input/output device 12-k are associated with each other in the device setting data D-k. For example, the setting data of the field device 11 has a plurality of variables. As one example, the setting data of the field device 11 has a type of sensor, a range of a sensor, a unit of a process value, other variables used for setting the device, and the like. Signs following hyphens are used for distinguishing a plurality of constituent elements of the same type from each other.

Figure 4:
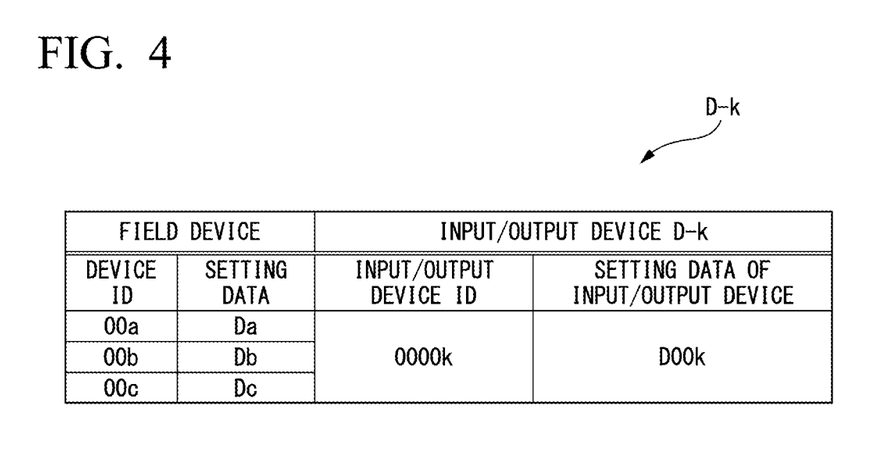
FIG. 4 is a diagram illustrating one example of device setting data D according to an embodiment of the present invention.

FIG. 4 is a diagram illustrating one example of the device setting data D-k corresponding to the input/output device 12-k according to an embodiment of the present invention. FIG. 4 represents device setting data D-k generated in a case in which three field devices 11a, 11b, and 11c are connected to the input/output device 12-k as an example. In the example illustrated in FIG. 4, a device ID "00a" of the field device 11a and setting data "Da" are associated with each other, a device ID "00b" of the field device 11b and setting data "Db" are associated with each other, and a device ID "00c" of the field device 11c and setting data "Dc" are associated with each other in the device setting data D-k. In addition, an input/output device ID "0000k" of the input/output device 12-k and setting data "D00k" are associated with each other in the device setting data D-k.

In a case in which the device setting data D-k stored in the database 33 is updated, the processor 34 provides the updated device setting data D-k for the input/output device 12-k. In addition, in a case in which the device setting data D-k is transmitted from the input/output device 12, the processor 34 updates the current device setting data D-k stored in the database 33 with the device setting data D-k transmitted from the input/output device 12. In accordance with this, the device setting data D-k inside the server apparatus 14 and the device setting data D-k inside the input/output device 12-k are synchronized with each other.

<Input/Output Device>

Figure 5:
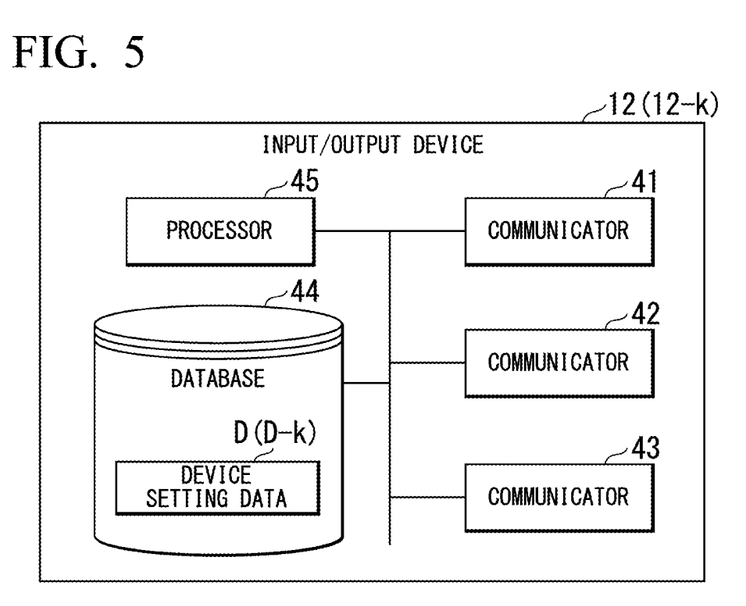
FIG. 5 is a block diagram illustrating a main part configuration of an input/output device according to an embodiment of the present invention.

FIG. 5 is a block diagram illustrating a main part configuration of an input/output device according to an embodiment of the present invention. As illustrated in FIG. 5, the input/output device 12 (the input/output device 12-k) according to this embodiment includes a communicator 41, a communicator 42, a communicator 43, a database 44, and a processor 45. The database 44 is one example of a "storage."

The communicator 41 communicates with a second terminal 200 under the control of the processor 45. In accordance with reception of an instruction from the second terminal 200 in the communicator 41, for example, the device setting data D (device setting data D-k) that has already been stored in the database 44 is updated with new device setting data D (device setting data D-k). The communicator 42 communicates with the server apparatus 14 under the control of the processor 45, thereby transmitting/receiving information to/from the server apparatus 14. The communicator 43 communicates with the field device 11 under the control of the processor 45.

The database 44 stores the device setting data D (the device setting data D-k). For example, the device setting data D-k stored in the database 44 is provided from the server apparatus 14. The device setting data D-k stored in the database 44 of the input/output device 12-k and the device setting data D-k stored in the database 33 of the server apparatus 14 are the same.

In a case in which connection between the communicator 43 and the field device 11 is established, the processor 45 transmits setting data associated with the device ID of the field device 11 with which the connection has been established out of the device setting data D-k stored in the database 44 to the field device 11, thereby setting the field device 11.

In a case in which new device setting data D-k is provided from the server apparatus 14, the processor 45 updates the device setting data D-k previously provided from the server apparatus 14 with the device setting data D-k newly provided from the server apparatus 14. In other words, when the device setting data D-k stored in the database 33 of the server apparatus 14 is updated, the device setting data D-k stored in the database 44 of the input/output device 12-k is overwritten with the device setting data D-k after update.

In a case in which the device setting data D-k stored in the database 44 is updated by the second terminal 200 or the like, the processor 45 transmits the updated device setting data D-k to the server apparatus 14. In accordance with this, the device setting data D-k stored in the database 33 is overwritten with the device setting data D-k after update.

In a case in which, after connection with a field device 11 is cut out, connection with the field device 11 having the same device ID as the device ID of the field device 11 with which the connection has been cut out is established, the processor 45 reads setting data associated with the device ID of the field device 11 with which the connection has been cut out from the database 44. Then, the processor 45 transmits the read setting data to the field device 11 with which the connection has been established, thereby setting the field device 11.

<Setting Method>

Next, a setting method for causing a field device 11 to perform a setting required for causing the field device 11 to perform a predetermined operation will be described. First, the procedure of a method for setting a field device 11 in a case in which device setting data D-k of the server apparatus 14 is updated by the first terminal 100 (hereinafter, referred to as a "first setting method") will be described.

<First Setting Method>

Figure 6:
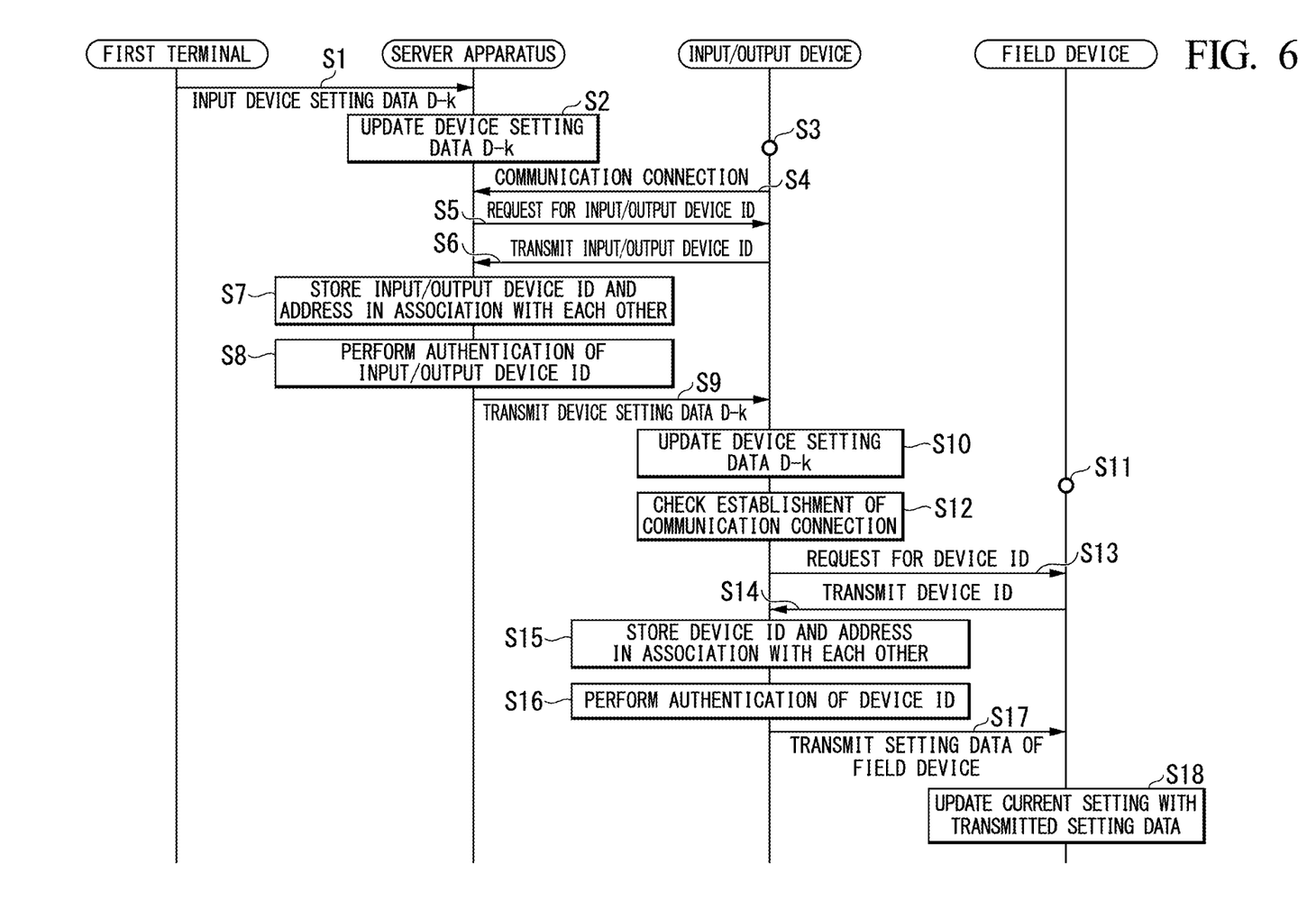
FIG. 6 is a sequence diagram illustrating a first setting method according to an embodiment of the present invention.

FIG. 6 is a sequence diagram illustrating the first setting method according to an embodiment of the present invention. Here, a case in which an operator A of the first terminal 100 and an operator B of the second terminal 200 set a field device 11 in cooperation will be described as an example. For simplification of description, it is assumed that only one field device 11 is connected to the input/output device 12-k.

First, by connecting the first terminal 100 to the server apparatus 14 by operating the first terminal 100, the operator A accesses the database 33 of the server apparatus 14. Then, the operator A inputs device setting data D-k to the database 33 by operating the first terminal 100 (Step S1). For example, the operator A inputs an input/output device ID of the input/output device 12-k and a device ID of a field device 11 connected to the input/output device 12-k to the database 33 using the first terminal 100. After inputting the input/output device ID and the device ID, the operator A inputs a desired value to a variable of each piece of setting data of the input/output device 12-k and the field device 11 connected to the input/output device 12-k using the first terminal 100.

When the input of the device setting data D-k is completed, the operator A outputs a setting update command from the first terminal 100 to the server apparatus 14. When a setting update command is received from the first terminal 100, the server apparatus 14 updates current device setting data D-k that has already been stored in the database 33 with the new device setting data D-k input to the first terminal 100 (Step S2).

Next, the operator B performs an operation of connecting the input/output device 12-k to the server apparatus 14 (Step S3). When this operation is performed, the input/output device 12-k establishes connection by communicating with the server apparatus 14 (Step S4).

When the connection with the input/output device 12-k is established in accordance with Step S4, the server apparatus 14 requests the input/output device 12-k for an input/output device ID by being triggered upon the establishment of the connection (Step S5). When the request for an input/output device ID is received from the server apparatus 14, the input/output device 12-k transmits the input/output device ID stored inside the input/output device 12-k to the server apparatus 14 (Step S6).

When the input/output device ID is received from the input/output device 12-k, the server apparatus 14 stores the input/output device ID and an address (for example, an IP address) of the input/output device 12-k in association with each other (Step S7). The server apparatus 14 performs an authentication process for checking whether or not the stored input/output device ID coincides with the input/output device ID stored in the database 33 (Step S8). In a case in which the authentication process has failed, the server apparatus 14, for example, performs retry of the authentication process, a re-request for an input/output device ID, a notification of error in the authentication process, and the like.

On the other hand, in a case in which the authentication process has been successful in Step S8, the server apparatus 14 transmits the device setting data D-k stored in the database 33 to the input/output device 12-k on the basis of an address associated with the input/output device ID for which the authentication process has been successful (Step S9).

When device setting data D-k is received from the server apparatus 14 in Step S9, the input/output device 12-k updates the device setting data D (the device setting data D-k) stored in the database 44 with the device setting data D-k received from the server apparatus 14 in Step S9 (Step S10). In accordance with the update of the device setting data D-k, the setting data of the input/output device 12-k associated with the device setting data D-k is updated as well.

Next, the operator B performs an operation of connecting a field device 11 to the input/output device 12-k (Step S11). When this operation is performed, the input/output device 12-k recognizes that communication connection with the field device 11 has been established (Step S12). The input/output device 12-k requests the field device 11 with which the communication connection has been established for a device ID 1 by being triggered upon the establishment of the communication connection with the field device 11 (Step S13).

When the request for a device ID is received from the input/output device 12-k, the field device 11 transmits the device ID stored inside the field device 11 to the input/output device 12-k (Step S14). When the device ID is received from the field device 11, the input/output device 12-k stores the device ID of the field device 11 and an address (for example, a node address) of the field device 11 in association with each other (Step S15). The input/output device 12-k performs an authentication process for checking whether or not the stored device ID coincides with the device ID stored in the database 44 (Step S16).

When the authentication process is successful in Step S16, the input/output device 12-k reads setting data of the field device 11 associated with the device ID for which the authentication process has been successful from the device setting data D-k inside the database 44. Then, the input/output device 12-k transmits the read setting data of the field device 11 to the field device 11 on the basis of the address of the field device 11 (Step S17).

When the setting data is received from the input/output device 12-k in Step S17, the field device 11 updates the current setting with the setting data received from the input/output device 12-k (Step S18). In this way, by transmitting setting data to a field device 11 in a case in which connection with the field device 11 has been established, the input/output device 12-k sets the field device 11. In a case in which the authentication process of Step S16 has failed, the input/output device 12-k, for example, performs retry of the authentication process, a re-request for a field device 11, a notification of error in the authentication process to the second terminal 200, and the like.

In performing the process of Step S3, in a case in which connection between the input/output device 12-k and the server apparatus 14 has already been established, the processes of Steps S3 to S7 may be omitted. In performing the process of Step S11, in a case in which connection between the input/output device 12-k and the field device 11 has already been established, the processes of Steps S11 to S15 may be omitted.

Next, a procedure of a method for setting a field device 11 in a case in which device setting data of the input/output device 12-k is updated by the second terminal 200 (hereinafter, referred to as a "second setting method") will be described.

<Second Setting Method>

Figure 7:
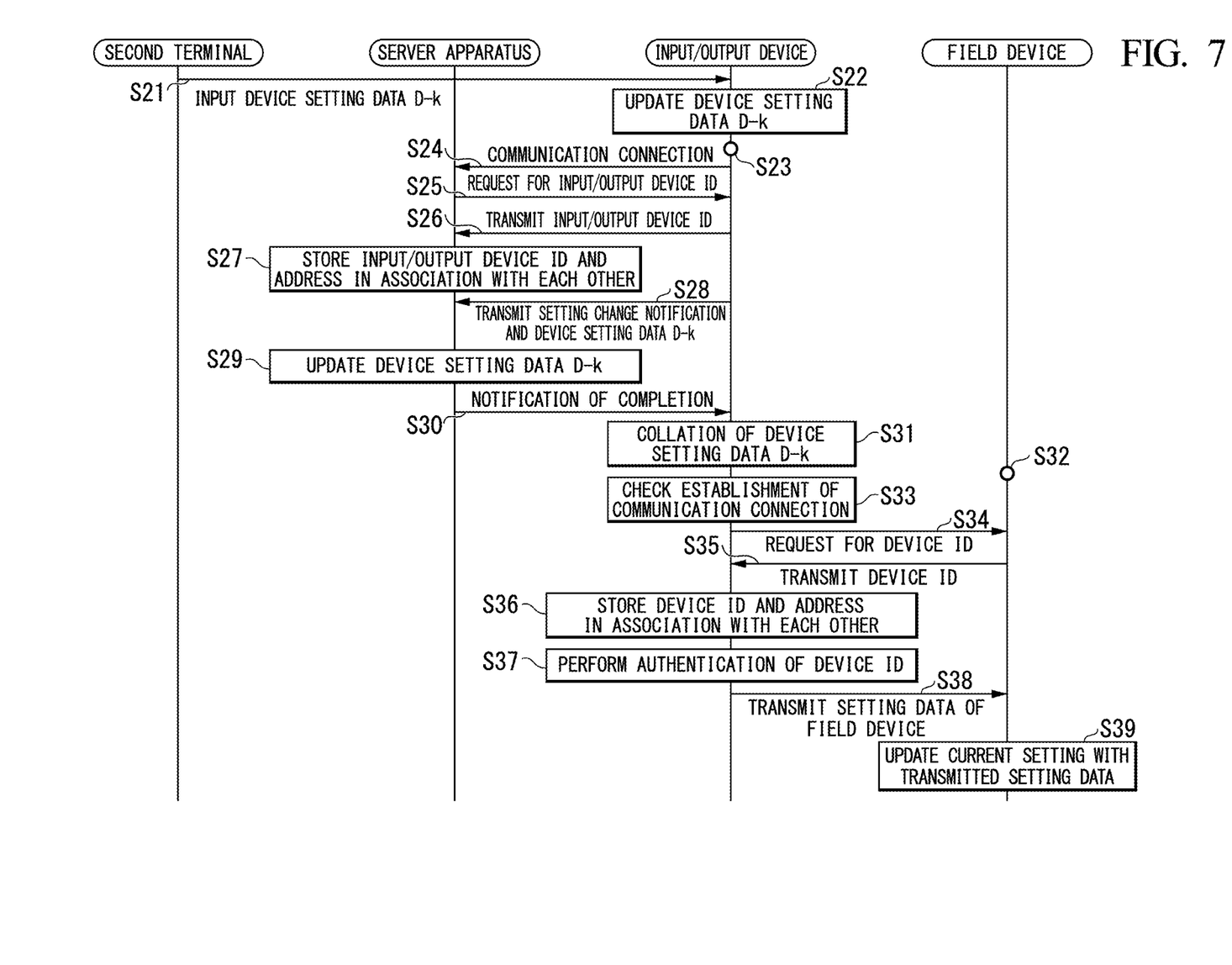
FIG. 7 is a sequence diagram illustrating a second setting method according to an embodiment of the present invention.

FIG. 7 is a sequence diagram illustrating the second setting method according to an embodiment of the present invention. Here, similar to FIG. 6, a case in which one field device 11 is connected to the input/output device 12-k will be described as an example. In the first setting method described above, although the setting of the field device 11 is performed by the operator A of the first terminal 100 and the operator B of the second terminal 200 in cooperation, the setting is performed only by the operator B of the second terminal 200 in the second setting method.

First, the operator B connects the second terminal 200 to the input/output device 12-k by operating the second terminal 200, thereby accessing the database 44 of the input/output device 12-k. The operator B inputs various kinds of information of the device setting data D-k to the database 44 by operating the second terminal 200 (Step S21). For example, the operator B inputs desired values to variables of the setting data of the field device 11 connected to the input/output device 12-k for the database 44 using the second terminal 200.

When the input of the setting data of the field device 11 is completed, the operator B outputs a setting update command to the input/output device 12-k from the second terminal 200. When the setting update command is received from the second terminal 200, the input/output device 12-k updates current device setting data D-k that has already been stored in the database 44 with new device setting data D-k input to the second terminal 200 (Step S22).

Next, the operator B performs an operation of connecting the input/output device 12-k to the server apparatus 14 (Step S23). When this operation is performed, the input/output device 12-k communicates with the server apparatus 14, thereby establishing connection (Step S24).

When connection with the input/output device 12-k is established in accordance with Step S24, the server apparatus 14 requests the input/output device 12-k for an input/output device ID by being triggered upon the establishment of the connection (Step S25). When the request for an input/output device ID is received from the server apparatus 14, the input/output device 12-k transmits an input/output device ID stored inside the input/output device 12-k to the server apparatus 14 (Step S26). When an input/output device ID is received from the input/output device 12-k, the server apparatus 14 stores the input/output device ID and an address (for example, an IP address) of the input/output device 12-k in association with each other (Step S27).

The input/output device 12-k transmits a notification indicating that update of the device setting data D-k has been performed in Step S22 (hereinafter referred to as a "setting change notification") and device setting data D-k after update to the server apparatus 14 (Step S28).

When the setting change notification is received from the input/output device 12-k, the server apparatus 14 updates current device setting data D-k stored in the database 33 with the device setting data D-k transmitted from the input/output device 12-k (Step S29). In a case in which update of the device setting data D-k has been performed, the server apparatus 14 notifies the input/output device 12-k of an indication representing that update has been performed (hereinafter referred to as a "completion notification") (Step S30).

The input/output device 12-k checks whether or not the device setting data D-k of the server apparatus 14 coincides with the device setting data D-k of its own device (the input/output device 12-k) on the basis of the completion notification from the server apparatus 14 (Step S31). For example, when the completion notification from the server apparatus 14 is received, the input/output device 12-k reads the device setting data D-k after update that is stored in the database 33. Then, the input/output device 12-k performs a collation process of determining whether or not the read device setting data D-k coincides with the device setting data D-k stored in the database 44. In a case in which the collation process has failed, for example, the input/output device 12-k performs retry of the collation process, re-reading of the device setting data D-k stored in the server apparatus 14, a notification of error in the collation process to the second terminal 200, and the like.

In a case in which the device setting data D-k of the server apparatus 14 coincides with the device setting data D-k of its own device as a result of the collation process, the input/output device 12-k transmits the device setting data D-k of its own device to the field device 11 by being triggered upon establishment of communication connection with the field device 11. In accordance with this, the field device 11 connected to the input/output device 12-k can be set. In other words, when the collation process is completed in Step S31, processes of Steps S32 to S39 are performed. The processes of Steps S32 to S39 are similar to the processes of Steps S11 to S18 illustrated in FIG. 6, and thus description thereof will be omitted.

Next, the procedure of a setting method in a case in which the field device 11 connected to the input/output device 12-k is replaced with a new field device 11 (hereinafter referred to as a "third setting method") will be described. The same device ID as the device ID of the field device 11 before replacement is assigned to a new field device 11 for replacement.

<Third Setting Method>

Figure 8:
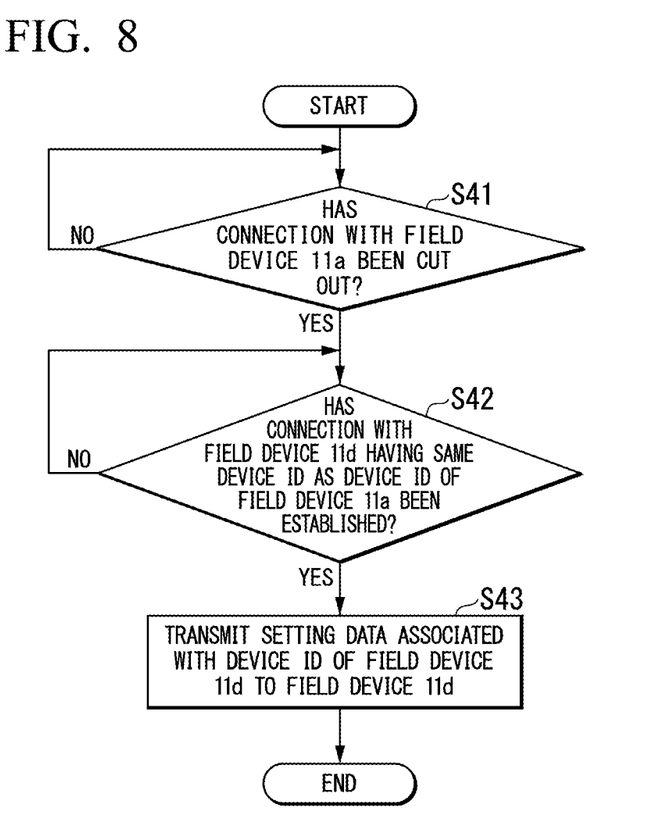
FIG. 8 is a flowchart representing a third setting method according to an embodiment of the present invention.

FIG. 8 is a flowchart representing a third setting method according to an embodiment of the present invention. For example, it is assumed that an operator B detaches a field device 11a from an input/output device 12-k and connects a new field device 11d to the input/output device 12-k. In such a case, a device ID of the field device 11d is set to a device ID of the field device 11a in advance.

The input/output device 12-k determines whether or not connection to the field device 11a has been cut out (Step S41). For example, by periodically performing communication (for example, transmission of a heart beat signal) with the field device 11a, the input/output device 12-k performs existence confirmation of the field device 11a as represented in Step S41. Thus, in a case in which the field device 11a is detached from the input/output device 12-k, and communication with the field device 11a becomes unable to be performed, the input/output device 12-k determines that connection with the field device 11a has been cut out.

After it is determined that the connection with the field device 11a has been cut out, the input/output device 12-k determines whether or not connection with a field device 11d having a device ID of the same identification information as the device ID of the field device 11a with which the connection has been cut out (Step S42). The input/output device 12-k may perform the process of Step S42 until connection with the field device 11d is established.

In a case in which connection with the field device 11d has been established, the input/output device 12-k reads setting data associated with the device ID of the field device 11d (the same device ID as that of the field device 11a) from the database 44. Then, by transmitting the read setting data to the field device 11d, the input/output device 12-k sets the field device 11d (Step S43). For example, as the process of Step S43, the input/output device 12-k may perform the processes of Steps S13 to S18 represented in FIG. 6.

In FIG. 8, although a case in which the field device 11 connected to the input/output device 12-k is replaced with a new field device 11 has been described as an example, the configuration is not limited thereto. For example, the third setting method can be applied also to a case in which a field device 11 detached from the input/output device 12-*k* is connected to the input/output device 12-*k* again. For example, the third setting method can be applied also to a case in which a field device 11 is detached from the input/output device 12-*k*, and the detached field device 11 is repaired and is connected to the input/output device 12-*k* again. In other words, the field device 11*d* described above may be any field device as long as it has the same device ID as the field device 11*a* and may be a new field device or may be the field device 11*a*.

As described above, in this embodiment, the input/output device 12 interposed between a field device 11 and a control device controlling the field device 11 is included. In a case in which connection with a field device 11 has been established, the input/output device 12 transmits setting data associated with a device ID of this field device 11 with which connection has been established out of device setting data provided from the server apparatus 14 to this field device, thereby setting the field device 11. In accordance with this, only by establishing communication between the field device 11 and the input/output device 12, setting data can be downloaded into the field device 11, and a manual operation of setting the field device 11 can be reduced. As a result, an operation time required for setting a field device can be shortened further compared with that of a conventional case.

In addition, in a case in which device setting data D to be provided has been updated, the server apparatus 14 provides the updated device setting data for the input/output device 12. The input/output device 12 may update device setting data previously provided from the server apparatus 14 with device setting data newly provided from the server apparatus 14. In accordance with this, setting data to be set in the field device 11 can be downloaded from the server apparatus 14 into the input/output device 12 via the Internet. As a result, on a site, only by connecting the field device 11 to the input/output device 12, the setting of the field device 11 can be automatically performed. In addition, by downloading device setting data D from the server apparatus 14 into the input/output device 12, the procedure is reduced, whereby the operation time can be reduced.

In a case in which the first terminal 100 connected to the server apparatus 14 is present in a factory manufacturing field device 11, device setting data D desired by a user may be input from the first terminal 100 to the server apparatus 14 at the time of shipment by a manufacturing staff. In accordance with this, only by user connecting the field device 11 to the server apparatus 14 via a network, the setting of the field device 11 can be automatically updated to a setting desired by the user. On the server apparatus 14, setting data of field devices 11 can be managed in a unified manner.

At the time of replacement of the field device 11, setting data of the field device 11 that has been originally connected to the input/output device 12 is synchronized with the input/output device 12, and, for example, the setting data of the field device 11 that has been originally connected is automatically downloaded into a new field device 11 at the time of replacement. In accordance with this, an operation time required for setting the field device 11 can be reduced. Here, the setting data of the field device 11 connected to the input/output device 12 being synchronized with the input/output device 12 represents a state in which values of the setting data are shared between the field device 11 and the input/output device 12, for example, using the method described with reference to FIG. 6 or 7. In other words, the setting data being synchronized with the input/output device 12 represents a state in which values of the setting data of the input/output device 12 and values of the setting data of the field device 11 connected to the input/output device 12 are the same using the method described with reference to FIG. 6 or 7.

In addition, settings of field devices 11 to be connected to the process control system PS can be remotely changed altogether in advance at the time of start-up. In accordance with this, a time and a cost required for movement of the operator A to a site can be reduced.

In addition, the operator B can set field devices 11 only by connecting the second terminal 200 to the input/output device 12 in a wired or wireless manner at the time of maintenance, and each field device 11 connected to the input/output device 12 and the second terminal 200 do not need to be individually connected. As a result, the efficiency of the maintenance operation is improved.

In a case in which a field device 11 is set by individually connecting the second terminal 200 to each field device 11, an error in physical communication connection and other errors in the operation procedure occur. In this embodiment, the second terminal 200 does not need to be individually connected to each field device 11, and an error in physical communication connection and an error in the operation procedure can be reduced.

As above, although the embodiment of the present invention has been described, the present invention can be freely changed within the scope of the present invention without being limited to the embodiment described above. For example, in the embodiment described above, the case of a three-stage system configuration in which the server apparatus 14 is disposed at the first stage, the input/output device 12 is disposed at the second stage, and the field device 11 is disposed at the third stage has been described as an example. However, the present invention can be applied also to the case of an N-stage (here N is an arbitrary natural number) system configuration. For example, the number of devices connected to the (K+1)-th stage when seen from a device of the K-th stage (here K is an arbitrary natural number equal to or greater than 1 and smaller than N) is an arbitrary number that is equal to or greater than 1. This device may be any one of the field device 11, the server apparatus 14, and the input/output device 12. In the case of N=2, a configuration in which the server apparatus 14 is disposed at the first stage, the field device is disposed at the second stage, and the input/output device 12 is not used is formed. In such a case, in a case in which connection with a field device 11 has been established, the server apparatus 14 sets the field device by transmitting setting data to the field device 11. The server apparatus 14 is one example of a "setting device".

As illustrated in Step S3 represented in FIG. 6 and Step S23 represented in FIG. 7, the input/output device 12 establishes connection by communicating with the server apparatus 14 in a case in which a connection instruction from the second terminal 200 has been received, the configuration is not limited thereto. For example, even in a case in which a connection instruction from the second terminal 200 has not been received such as a case in which power is turned on or the like, the input/output device 12 may establish connection by communicating with the server apparatus 14 in accordance with a certain trigger.

Each component disposed in the input/output device 12 may be realized by hardware or software or a combination thereof. The first setting method, the second setting method, and the third setting method are performed by components in cooperation and can be realized by hardware or software or a combination thereof. Here, being realized by software represents being realized by a computer reading and executing a program.

The program is stored using various computer-readable recording media and can be supplied to a computer. Examples of the computer-readable recording medium include a magnetic recording medium (for example, a flexible disk, a hard disk drive, or a magneto-optical disk), a DVD-read only memory (ROM), a DVD-R, a DVD-R/W, and a semiconductor memory (for example, a mask ROM, a programmable ROM (PROM), an erasable PROM (EPROM), a flash ROM, and a random access memory (RAM)).

The embodiment described above may be realized not only by a single apparatus but also by cloud computing via a network.

[Supplementary Note]

A setting system according to one aspect of the present invention is a setting system (1) may perform setting required for causing a field device (11) to perform a predetermined operation on the field device. The setting system may include a server apparatus (14) configured to provide device setting data in which identification information of the field device and setting data to be set in the field device are associated with other, and an input/output device (12) that is a device interposed between the field device and a control device (13) controlling the field device, wherein in a case in which connection between the input/output device and the field device has been established, the input/output device is configured to perform the setting of the field device by transmitting, to the field device, the setting data associated with the identification information of the field device with which the connection has been established out of the device setting data provided from the server apparatus.

In addition, in the setting system according to one aspect of the present invention, in a case in which the device setting data to be provided has been updated, the server apparatus is configured to provide the updated device setting data to the input/output device, and the input/output device is configured to update the device setting data previously provided from the server apparatus with the device setting data newly provided from the server apparatus.

In addition, in the setting system according to one aspect of the present invention, in a case in which the device setting data provided from the server apparatus has been updated, the input/output device is configured to transmit the updated device setting data to the server apparatus, and the server apparatus is configured to update current device setting data with the device setting data transmitted from the input/output device.

In addition, in the setting system according to one aspect of the present invention, in a case in which the server apparatus has updated the device setting data transmitted from the input/output device, the server apparatus is configured to notify the input/output device of an indication representing that the device setting data has been updated, and the input/output device is configured to check whether or not the device setting data of the server apparatus coincides with the device setting data of the input/output device on the basis of a notification from the server apparatus.

In addition, in the setting system according to one aspect of the present invention, in a case in which, after connection between the input/output device and the field device has been cut out, connection between the input/output device and the field device having the same identification information as identification information of the field device with which the connection has been cut out is established, the input/output device is configured to perform setting of the field device by transmitting, to the field device with which the connection has been established, the setting data associated with the identification information of the field device with which the connection has been cut out.

A setting device according to one aspect of the present invention is a setting device (12) may perform setting required for causing a field device to perform a predetermined operation on the field device. The setting device may include a communicator (43) configured to communicate with the field device, a storage (44) configured to store device setting data in which identification information of the field device and setting data to be set in the field device are associated with other, and a processor (45) configured to, in a case in which connection between the input/output device and the field device has been established, perform the setting of the field device by transmitting, to the field device, the setting data associated with the identification information of the field device with which the connection has been established out of the device setting data stored in the storage.

In addition, in the setting device according to one aspect of the present invention, the setting device is an input/output device interposed between the field device and a control device controlling the field device.

In addition, in the setting device according to one aspect of the present invention, the input/output device is connected to a server apparatus configured to provide the device setting data. In a case in which the device setting data has been provided from the server apparatus to the input/output device, the input/output device is configured to update the device setting data previously provided from the server apparatus with the device setting data newly provided from the server apparatus.

In addition, in the setting device according to one aspect of the present invention, in a case in which the device setting data provided from the server apparatus has been updated, the input/output device is configured to transmit the updated device setting data to the server apparatus.

In addition, in the setting device according to one aspect of the present invention, in a case in which the server apparatus has notified the input/output device of an indication representing that the device setting data has been updated, the input/output device is configured to check whether or not the device setting data of the server apparatus coincides with the device setting data of the input/output device on the basis of a notification from the server apparatus.

In addition, in the setting device according to one aspect of the present invention, in a case in which, after connection between the input/output device and the field device has been cut out, connection between the input/output device and the field device having the same identification information as identification information of the field device with which the connection has been cut out is established, the input/output device is configured to perform setting of the field device by transmitting, to the field device with which the connection has been established, the setting data associated with the identification information of the field device with which the connection has been cut out.

A setting method according to one aspect of the present invention is a setting method for performing setting required for causing a field device (11) to perform a predetermined operation on the field device. The setting method may be performed by an input/output device (12) interposed between the field device and a control device (13) controlling the field device. The setting method may include, in a case in which connection between the input/output device and the field device has been established, performing the setting of the field device by transmitting, to the field device, the setting data associated with the identification information of the field device with which the connection has been established out of the device setting data in which the identification information of the field device and the setting data to be set in the field device are associated with each other.

In addition, in the setting method according to one aspect of the present invention, the input/output device may be connected to a server apparatus configured to provide the device setting data. The setting method may further include, in a case in which the device setting data has been provided from the server apparatus to the input/output device, updating, by the input/output device, the device setting data previously provided from the server apparatus with the device setting data newly provided from the server apparatus.

In addition, the setting method according to one aspect of the present invention may further include, in a case in which the device setting data provided from the server apparatus has been updated, transmitting, by the input/output device, the updated device setting data to the server apparatus.

In addition, the setting method according to one aspect of the present invention may further include, in a case in which the server apparatus has notified the input/output device of an indication representing that the device setting data has been updated, checking, by the input/output device, whether or not the device setting data of the server apparatus coincides with the device setting data of the input/output device on the basis of a notification from the server apparatus.

In addition, the setting method according to one aspect of the present invention may further include, in a case in which, after connection between the input/output device and the field device has been cut out, connection between the input/output device and the field device having the same identification information as identification information of the field device with which the connection has been cut out is established, performing, by the input/output device, setting of the field device by transmitting, to the field device with which the connection has been established, the setting data associated with the identification information of the field device with which the connection has been cut out.

A non-transitory computer readable storage medium according to one aspect of the present invention is a non-transitory computer readable storage medium storing a program executed by a setting device (12) performing setting required for causing a field device (11) to perform a predetermined operation on the field device. The program may instruct the setting device to communicate with the field device, store device setting data in which identification information of the field device and setting data to be set in the field device are associated with other, and in a case in which connection between the input/output device and the field device has been established, perform the setting of the field device by transmitting, to the field device, the setting data associated with the identification information of the field device with which the connection has been established out of the stored device setting data.

In addition, in the non-transitory computer readable storage medium according to one aspect of the present invention, the setting device may be an input/output device interposed between the field device and a control device controlling the field device.

In addition, in the non-transitory computer readable storage medium according to one aspect of the present invention, the input/output device may be connected to a server apparatus configured to provide the device setting data. The program may instruct the input/output device to, in a case in which the device setting data has been provided from the server apparatus to the input/output device, update the device setting data previously provided from the server apparatus with the device setting data newly provided from the server apparatus.

In addition, in the non-transitory computer readable storage medium according to one aspect of the present invention, the program may instruct the input/output device to, in a case in which the device setting data provided from the server apparatus has been updated, transmit the updated device setting data to the server apparatus.

A setting program according to one aspect of the present invention may be a program executed by a setting device (12) performing setting required for causing a field device (11) to perform a predetermined operation on the field device. The program may instruct the setting device to communicate with the field device, store device setting data in which identification information of the field device and setting data to be set in the field device are associated with other, and in a case in which connection between the input/output device and the field device has been established, perform the setting of the field device by transmitting, to the field device, the setting data associated with the identification information of the field device with which the connection has been established out of the stored device setting data.

According to the present invention, there is an effect of being capable of shortening an operation time required for setting field devices further compared with that of a conventional case.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A setting system comprising a server apparatus and an input/output device, the setting system performing setting required for causing a field device to perform a predetermined operation on the field device,
  wherein the server apparatus is configured to provide device setting data in which first identification information for identifying the field device and first setting data to be set in the field device are associated with each other, and in which second identification information for identifying the input/output device and second setting data to be set in the input/output device are associated with each other, and
  wherein the input/output device comprises:
  a first communicator configured to communicate with the field device;
  a second communicator configured to communicate with the server apparatus that provides the device setting data;
  a storage configured to store the device setting data received by the second communicator; and
  a processor configured to, in a case in which connection between the input/output device and the field device has been established, perform the setting of the field device by transmitting, to the field device, the first setting data associated with the first identification information of the field device with which the connection has been established out of the device setting data stored in the storage.

2. The setting system according to claim 1,
  wherein in a case in which the device setting data to be provided has been updated, the server apparatus is configured to provide the updated device setting data to the input/output device, and
  wherein the input/output device is configured to update the device setting data previously provided from the server apparatus with the device setting data newly provided from the server apparatus.

3. The setting system according to claim 1,
  wherein in a case in which the device setting data provided from the server apparatus has been updated, the input/output device is configured to transmit the updated device setting data to the server apparatus, and
  wherein the server apparatus is configured to update current device setting data with the device setting data transmitted from the input/output device.

4. The setting system according to claim 3,
  wherein in a case in which the server apparatus has updated the device setting data transmitted from the input/output device, the server apparatus is configured to notify the input/output device of an indication representing that the device setting data has been updated, and
  wherein the input/output device is configured to check whether or not the device setting data of the server apparatus coincides with the device setting data of the input/output device on the basis of a notification from the server apparatus.

5. The setting system according to claim 1,
  wherein in a case in which, after connection between the input/output device and the field device has been cut out, connection between the input/output device and the field device having the same identification information as identification information of the field device with which the connection has been cut out is established, the input/output device is configured to perform setting of the field device by transmitting, to the field device with which the connection has been established, the setting data associated with the identification information of the field device with which the connection has been cut out.

6. An input/output device performing setting required for causing a field device to perform a predetermined operation on the field device, the input/output device comprising:
  a first communicator configured to communicate with the field device;
  a second communicator configured to communicate with a server apparatus that provides device setting data in which first identification information for identifying the field device and first setting data to be set in the field device are associated with each other, and in which second identification information for identifying the input/output device and second setting data to be set in the input/output device are associated with each other;
  a storage configured to store the device setting data received by the second communicator; and
  a processor configured to, in a case in which connection between the input/output device and the field device has been established, perform the setting of the field device by transmitting, to the field device, the first setting data associated with the first identification information of the field device with which the connection has been established out of the device setting data stored in the storage.

7. The input/output device according to claim 6,
  wherein the input/output device is connected to a server apparatus configured to provide the device setting data,
  wherein in a case in which the device setting data has been provided from the server apparatus to the input/output device, the input/output device is configured to update the device setting data previously provided from the server apparatus with the device setting data newly provided from the server apparatus.

8. The input/output device according to claim 6,
  wherein in a case in which the device setting data provided from the server apparatus has been updated, the input/output device is configured to transmit the updated device setting data to the server apparatus.

9. The input/output device according to claim 8,
  wherein in a case in which the server apparatus has notified the input/output device of an indication representing that the device setting data has been updated, the input/output device is configured to check whether or not the device setting data of the server apparatus coincides with the device setting data of the input/output device on the basis of a notification from the server apparatus.

10. The input/output device according to claim 6,
  wherein in a case in which, after connection between the input/output device and the field device has been cut out, connection between the input/output device and the field device having the same identification information as identification information of the field device with which the connection has been cut out is established, the input/output device is configured to perform setting of the field device by transmitting, to the field device with which the connection has been established, the setting data associated with the identification information of the field device with which the connection has been cut out.

11. A setting method for performing setting required for causing a field device to perform a predetermined operation on the field device, the setting method being performed by an input/output device interposed between the field device and a control device controlling the field device, the setting method comprising:
communicating with the field device by a first communicator;
communicating, by a second communicator, with a server apparatus that provides device setting data in which first identification information for identifying the field device and first setting data to be set in the field device are associated with each other, and in which second identification information for identifying the input/output device and second setting data to be set in the input/output device are associated with each other;
storing, into a storage, the device setting data received by the second communicator; and
in a case in which connection between the input/output device and the field device has been established, performing, by a processor, the setting of the field device by transmitting, to the field device, the first setting data associated with the first identification information of the field device with which the connection has been established out of the device setting data stored in the storage.

12. The setting method according to claim 11, wherein the input/output device is connected to a server apparatus configured to provide the device setting data, wherein the setting method further comprises:
in a case in which the device setting data has been provided from the server apparatus to the input/output device, updating, by the input/output device, the device setting data previously provided from the server apparatus with the device setting data newly provided from the server apparatus.

13. The setting method according to claim 11, further comprising:
in a case in which the device setting data provided from the server apparatus has been updated, transmitting, by the input/output device, the updated device setting data to the server apparatus.

14. The setting method according to claim 13, further comprising:
in a case in which the server apparatus has notified the input/output device of an indication representing that the device setting data has been updated, checking, by the input/output device, whether or not the device setting data of the server apparatus coincides with the device setting data of the input/output device on the basis of a notification from the server apparatus.

15. The setting method according to claim 11, further comprising:
in a case in which, after connection between the input/output device and the field device has been cut out, connection between the input/output device and the field device having the same identification information as identification information of the field device with which the connection has been cut out is established, performing, by the input/output device, setting of the field device by transmitting, to the field device with which the connection has been established, the setting data associated with the identification information of the field device with which the connection has been cut out.

16. A non-transitory computer readable storage medium storing a program executed by an input/output device performing setting required for causing a field device to perform a predetermined operation on the field device, the program instructing the input/output device to:
communicate with the field device by a first communicator;
communicate, by a second communicator, with a server apparatus that provides device setting data in which first identification information for identifying the field device and first setting data to be set in the field device are associated with each other, and in which second identification information for identifying the input/output device and second setting data to be set in the input/output device are associated with each other;
store, into a storage, the device setting data received by the second communicator; and
in a case in which connection between the input/output device and the field device has been established, perform, by a processor, the setting of the field device by transmitting, to the field device, the first setting data associated with the first identification information of the field device with which the connection has been established out of the stored device setting data stored in the storage.

17. The non-transitory computer readable storage medium according to claim 16,
wherein the input/output device is connected to a server apparatus configured to provide the device setting data, wherein the program instructs the input/output device to:
in a case in which the device setting data has been provided from the server apparatus to the input/output device, update the device setting data previously provided from the server apparatus with the device setting data newly provided from the server apparatus.

18. The non-transitory computer readable storage medium according to claim 16,
wherein the program instructs the input/output device to:
in a case in which the device setting data provided from the server apparatus has been updated, transmit the updated device setting data to the server apparatus.

* * * * *